(12) United States Patent
Toda

(10) Patent No.: US 12,096,296 B2
(45) Date of Patent: Sep. 17, 2024

(54) INFORMATION PROCESSING APPARATUS, NON-TRANSITORY COMPUTER READABLE MEDIUM, AND INFORMATION PROCESSING METHOD FOR OUTPUTTING INFORMATION RELATING TO SWITCHING ACCESS POINT

(71) Applicant: FUJIFILM Business Innovation Corp., Tokyo (JP)

(72) Inventor: Shuhei Toda, Yokohama (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 353 days.

(21) Appl. No.: 17/575,172

(22) Filed: Jan. 13, 2022

(65) Prior Publication Data
US 2023/0078370 A1    Mar. 16, 2023

(30) Foreign Application Priority Data
Sep. 10, 2021   (JP) .................. 2021-147611

(51) Int. Cl.
*H04W 36/08*   (2009.01)
*G06F 3/12*    (2006.01)
*H04W 36/30*   (2009.01)

(52) U.S. Cl.
CPC .......... *H04W 36/08* (2013.01); *G06F 3/1203* (2013.01); *G06F 3/1236* (2013.01); *G06F 3/1286* (2013.01); *G06F 3/1292* (2013.01); *H04W 36/30* (2013.01)

(58) Field of Classification Search
CPC . H04W 36/08–087; H04W 36/30–304; H04W 36/36; H04W 36/00–385; H04W 48/20
See application file for complete search history.

(56) References Cited

U.S. PATENT DOCUMENTS

| | | | |
|---|---|---|---|
| 10,575,244 B1 * | 2/2020 | Gustafson | H04W 64/00 |
| 10,645,743 B2 | 5/2020 | Ikeda | |
| 11,641,584 B1 * | 5/2023 | Timm | H04L 63/1416 726/25 |

(Continued)

FOREIGN PATENT DOCUMENTS

| | | |
|---|---|---|
| JP | 2013-070135 A | 4/2013 |
| JP | 2019-149663 A | 9/2019 |

*Primary Examiner* — Brendan Y Higa
(74) *Attorney, Agent, or Firm* — Oliff PLC

(57) ABSTRACT

An information processing apparatus includes a processor configured to: when three conditions are satisfied, output information indicating that there is possibility that an access point to be connected is switched, the first condition being that an automatic switching setting for automatically switching the access point is ON, the automatic switching being made in accordance with the reception strength of a radio wave from the access point, the second condition being that the information processing apparatus connects to a first access point, the first access point being capable of connecting to a device, the device performing a process, the third condition being that the information processing apparatus is allowed to establish a connection to a second access point, the second access point being not capable of connecting to the device, the second access point having a higher reception strength of a radio wave than the first access point.

12 Claims, 6 Drawing Sheets

(56) References Cited

U.S. PATENT DOCUMENTS

| | | | |
|---|---|---|---|
| 2011/0305229 A1* | 12/2011 | Kim | H04W 36/08 |
| | | | 370/338 |
| 2017/0123739 A1* | 5/2017 | Konji | G06F 3/1236 |
| 2017/0215093 A1* | 7/2017 | Zhang | H04W 24/02 |
| 2018/0027463 A1* | 1/2018 | Chen | H04W 48/16 |
| | | | 370/331 |
| 2020/0106920 A1* | 4/2020 | Ruan | G06F 3/1236 |
| 2021/0377835 A1* | 12/2021 | Yoshida | H04W 24/02 |
| 2023/0063379 A1* | 3/2023 | Taguchi | H04W 64/003 |

* cited by examiner

INFORMATION PROCESSING APPARATUS, NON-TRANSITORY COMPUTER READABLE MEDIUM, AND INFORMATION PROCESSING METHOD FOR OUTPUTTING INFORMATION RELATING TO SWITCHING ACCESS POINT

CROSS-REFERENCE TO RELATED APPLICATIONS

This application is based on and claims priority under 35 USC 119 from Japanese Patent Application No. 2021-147611 filed Sep. 10, 2021.

BACKGROUND

(i) Technical Field

The present disclosure relates to an information processing apparatus, a non-transitory computer readable medium, and an information processing method.

(ii) Related Art

A device (for example, a printer) for performing processes may be connected via an access point, and may be requested to perform the process.

Japanese Unexamined Patent Application Publication No. 2019-149663 describes an apparatus which displays a display image on a display unit. The display image is made on the basis of the following pieces of information: information about the degree of interference of radio waves in communication with an electronic device in a first wireless communication system; and information about the distance to the electronic device, which is obtained on the basis of beacon signals received in a second wireless communication system.

Japanese Unexamined Patent Application Publication No. 2013-070135 describes a system which performs the following operations: the system sequentially transmits, to a mobile terminal, connection requests in communication channels using the wireless access points (APs) of a signage at predetermined time intervals; measures radio wave strengths of the connection responses replied sequentially from the respective wireless APs; summarizes the radio wave strengths of the connection responses in a time series manner; estimates the state of a move relative to the signage on the basis of the summarization result; and controls connections with the wireless APs on the basis of the estimation result.

After an apparatus establishes a connection to a device, which performs processes, via an access point, the apparatus may switch the access point, to be connected, to a second access point automatically. In this case, the apparatus may fail to make the device perform the process.

SUMMARY

Aspects of non-limiting embodiments of the present disclosure relate to a technique of notifying a user that an access point, through which the user connects to a device for performing processes, may be switched automatically.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to, when first to third conditions are satisfied, output information indicating that there is possibility that an access point to be connected is switched, the first condition being that an automatic switching setting is ON, the automatic switching setting being a setting for automatically switching the access point, the automatic switching being made in accordance with a reception strength of a radio wave from the access point, the second condition being that the information processing apparatus connects to a first access point, the first access point being capable of connecting to a device, the device performing a process, the third condition being that the information processing apparatus is allowed to establish a connection to a second access point, the second access point being not capable of connecting to the device, the second access point having a higher reception strength of a radio wave than the first access point.

BRIEF DESCRIPTION OF THE DRAWINGS

Exemplary embodiment of the present disclosure will be described in detail based on the following figures, wherein.

DETAILED DESCRIPTION

Figure 1:
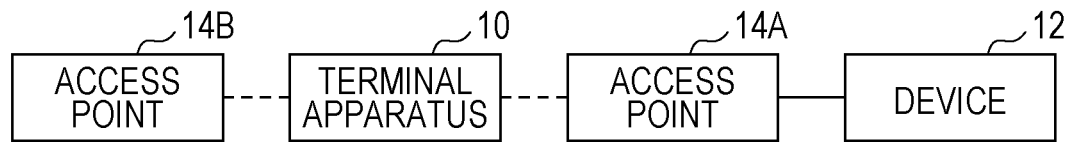
FIG. 1 is a block diagram illustrating the configuration of an information processing system.

Referring to FIG. 1, an information processing system according to an exemplary embodiment will be described. FIG. 1 illustrates an exemplary configuration of an information processing system according to an exemplary embodiment.

For example, the information processing system according to the exemplary embodiment includes one or more terminal apparatuses 10, one or more devices 12, and one or more access points (APs). In the example in FIG. 1, for example, access points 14A and 14B are included in the information processing system. FIG. 1 illustrates one terminal apparatus 10, one device 12, and two access points. These numbers are merely exemplary. The information processing system includes one or more terminal apparatuses 10, one or more devices 12, and one or more access points.

A terminal apparatus 10 is, for example, a personal computer (hereinafter referred to as a "PC"), a tablet PC, a smartphone, or a cellular phone. The terminal apparatus 10 corresponds to an exemplary information processing apparatus.

A device 12 is, for example, a printer, a scanner, a copier, a facsimile, a multifunction device (for example, an apparatus having functions of printing, scanning, copying, and the like), a PC, a display, an electric household appliance (for example, an air conditioner, a lighting fixture, or a refrigerator), a storage device, or another apparatus. These merely indicate examples of a device 12. A device other than these may be included as a device 12 in the information processing system. For example, any apparatus may be used as a device 12 as long as the device 12 receives, from an apparatus other than the device 12 via an access point, a request for execution of a process, and performs the process in response to the request.

The access points 14A and 14B are devices (for example, wireless equipment) which connect apparatuses, such as the terminal apparatuses 10 and the devices 12, to each other through wireless communication. The access points 14A and 14B may connect apparatuses to communication paths, such as a local area network (LAN) and the Internet, through wireless communication, or may connect wired LANs to wireless LANs. Apparatuses such as wireless LAN routers, which have both the router function and the access point function, may be used as the access points 14A and 14B. Apparatuses, which operate as clients in wireless communication and which have the access point function as software, may be used as the access points 14A and 14B. The wireless communication is, for example, Wi-Fi™. A wireless communication technique other than Wi-Fi may be used. The standard of the wireless communication (for example, the bandwidth in communication) is not particularly limited. Any standard may be used.

For example, a terminal apparatus 10 is connected to a device 12 through wireless communication via an access point, and transmits, to the device 12, information indicating a request to perform a process. The device 12 receives, from the terminal apparatus 10 via the access point, the information indicating a request for execution of a process, and performs the process in response to the request. Thus, a device 12 receives, from a terminal apparatus 10 via an access point, information indicating a request for execution of a process, and performs the process.

Figure 2:
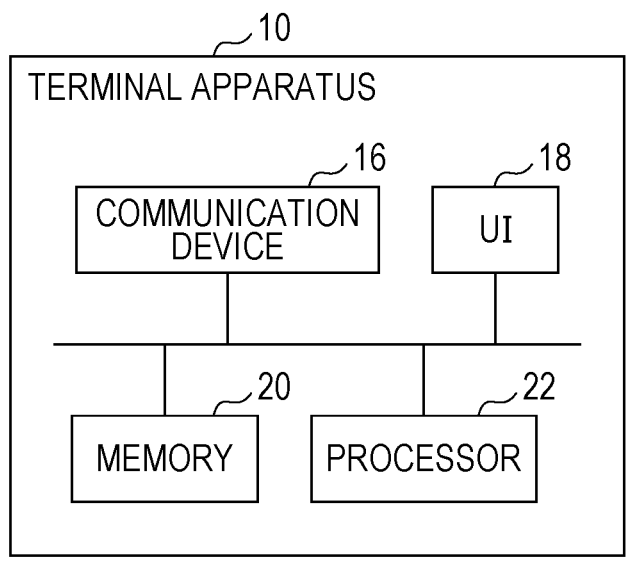
FIG. 2 is a block diagram illustrating the hardware configuration of a terminal apparatus.

Referring to FIG. 2, the hardware configuration of a terminal apparatus 10 will be described below. FIG. 2 illustrates an exemplary hardware configuration of a terminal apparatus 10.

The terminal apparatus 10 includes, for example, a communication device 16, a user interface (UI) 18, a memory 20, and a processor 22.

The communication device 16 is a communication interface having a communication chip, a communication circuit, or the like, and has a function of transmitting information to other apparatuses and a function of receiving information transmitted from other apparatuses. The communication device 16, which has a wireless communication function, connects to an access point through wireless communication, and communicates with other apparatuses via the access point. The communication device 16 may have a wired communication function.

The UI 18, which is a user interface, includes a display and operation devices. The display is, for example, a liquid-crystal display or a light emitting (EL) display. Examples of the operation devices include a keyboard, a mouse, an input key, and an operation panel. The UI 18 may be a UI such as a touch panel serving as a display and an operation device. The UI 18 may include a microphone and a speaker.

The memory 20 is a device constituting one or more storage areas for storing data. The memory 20 is, for example, a hard disk drive (HDD), a solid state drive (SSD), various memories (for example, a random-access memory (RAM), a dynamic random access memory (DRAM), and a read-only memory (ROM)), another storage device (for example, an optical disk), or a combination of these. The terminal apparatus 10 includes one or more memories 20.

The processor 22 controls operations of the units of the terminal apparatus 10. The processor 22 may have a memory.

The terminal apparatus 10 has a function of automatically switching the access point, to be connected to the terminal apparatus 10, in accordance with the reception strengths of radio waves from access points, which are obtained at the terminal apparatus 10. Hereinafter, the function of automatically switching the access point, to be connected, in accordance with the reception strengths of radio waves from access points, which are obtained at the terminal apparatus 10, is referred to as an "automatic switching function".

When the automatic switching function is set to ON, the processor 22 of the terminal apparatus 10 automatically switches the access point, to be connected to the terminal apparatus 10, in accordance with the reception strengths of radio waves from access points, which are obtained at the terminal apparatus 10. When the automatic switching function is set to OFF, the processor 22 of the terminal apparatus 10 does not switch the access point, to be connected to the terminal apparatus 10, automatically in accordance with the reception strengths of radio waves from access points at the terminal apparatus 10. For example, a user sets the automatic switching function to ON or OFF. The automatic switching function may be set to ON or OFF in advance, and a user may switch the automatic switching function between ON and OFF.

Assume the case in which the terminal apparatus 10, which connects to a certain access point 14, receives radio waves from a second access point. Even in this case, as long as the access point, to be connected, is not switched to the second access point, the terminal apparatus 10 does not establish a connection to the second access point. For example, even when the terminal apparatus 10, which connects to the access point 14A, receives radio waves from the access point 14B, as long as the access point, to be connected, is not switched to the access point 14B, the terminal apparatus 10 does not establish a connection to the access point 14B, and continues to connect to the access point 14A.

For example, the automatic switching function is a function of switching the access point, to be connected to the terminal apparatus 10, to the access point having the highest reception strength of radio waves at the terminal apparatus 10. In this case, when the automatic switching function is set to ON, the processor 22 of the terminal apparatus 10 establishes a connection to the access point having the highest reception strength of radio waves at the terminal apparatus 10.

A concrete example will be described. Assume that the terminal apparatus 10 has already been connected to the access point 14A. In this case, when the reception strength of radio waves from the access point 14B at the terminal apparatus 10 is higher than that from the access point 14A, to which the terminal apparatus 10 connects, if the automatic switching function is set to ON, the processor 22 of the terminal apparatus 10 switches the access point, to be connected to the terminal apparatus 10, from the access point 14A to the access point 14B. For example, the terminal apparatus 10 establishes a connection to the access point 14A at a certain place. After that, the user who carries the terminal apparatus 10 moves. At that time, the reception strength of radio waves from the access point 14B at the terminal apparatus 10 may be higher than that from the access point 14A. In this case, the processor 22 of the terminal apparatus 10 switches the access point, to be connected to the terminal apparatus 10, from the access point 14A to the access point 14B.

The automatic switching function may be one of the following functions: a function of switching the access point, to be connected to the terminal apparatus 10, to the access point, whose reception strength of radio waves at the terminal apparatus 10 is the highest continuously during a predetermined time or longer; a function of switching the access point, to be connected to the terminal apparatus 10, to a second access point when the difference between the reception strength of radio waves from the access point, to which the terminal apparatus 10 connects, and that from the second access point having a reception strength higher than that from the access point, to which the terminal apparatus 10 connects, is equal to a threshold or greater; a function of switching the access point, to be connected to the terminal apparatus 10, to a second access point when the reception strength of radio waves from the access point, to which the terminal apparatus 10 connects, is equal to a lower-limit threshold or less and when the difference between the reception strength of radio waves from the access point, to which the terminal apparatus 10 connects, and that from the second access point is equal to a threshold or greater.

In the exemplary embodiment, assume the case in which the automatic switching function is set to ON, and in which the terminal apparatus 10 connects to a first access point that is capable of connecting to the device 12 which performs processes. When the terminal apparatus 10 may establish a connection to a second access point which is not capable of connecting to the device 12 and whose reception strength of radio waves is higher than that from the first access point at the terminal apparatus 10, the processor 22 of the terminal apparatus 10 outputs information indicating that the access point, to be connected to the terminal apparatus 10, may be switched. The information indicating that the access point may be switched is referred to as "alert information".

The first access point, which is capable of connecting to the device 12 which performs processes, is an access point which connects to the device 12. The second access point, which is not capable of connecting to the device 12 which performs processes, is an access point which does not connect to the device 12. The terminal apparatus 10 is capable of connecting to the device 12 via the first access point and requesting the device 12 to perform a process, but is not capable of connecting to the device 12 via the second access point and transmitting, to the device 12 via the second access point, a request for execution of a process.

The case in which the terminal apparatus 10 connects to the first access point is, for example, one of the following cases: the case in which the terminal apparatus 10 has been already connected to the first access point (that is, the case in which the terminal apparatus 10 connects to the first access point); the case in which a user selects the first access point as the access point, to be connected, when the terminal apparatus 10 is not connected to the first access point; the case in which a user gives an instruction to establish a connection to the first access point when the terminal apparatus 10 is not connected to the first access point; the case in which a user selects a device 12, which is connected to the first access point, as the device 12 which performs a process requested by the user.

The case in which the terminal apparatus 10 is capable of establishing a connection to the second access point is, for example, the case in which the terminal apparatus 10 receives radio waves from the second access point, or the case in which the terminal apparatus 10 is located at a position at which the terminal apparatus 10 is capable of receiving radio waves from the second access point.

The case in which the access point, to be connected to the terminal apparatus 10, may be switched is, for example, one of the following cases: the case in which the terminal apparatus 10 is capable of establishing a connection to the second access point whose reception strength is higher than that from the first access point; the case in which the difference between the reception strength of radio waves from the first access point and that from the second access point, which has a higher reception strength, is equal to the threshold or greater; the case in which the reception strength of radio waves from the first access point is equal to or lower than the lower-limit threshold.

Output of alert information is, for example, one of the following operations: displaying a message, indicating the alert information, on the display of the terminal apparatus 10; generating a message, indicating the alert information, from the speaker of the terminal apparatus 10 as a voice; generating a sound such as alert sound from the speaker of the terminal apparatus 10; generating a vibration corresponding to the alert from the terminal apparatus 10; generating light corresponding to the alert from the terminal apparatus 10; a combination of these.

For example, the processor 22 of the terminal apparatus 10 has established a connection to the access point 14A to cause a device 12, which connects to the access point 14A (for convenience of description, the device 12, which connects to the access point 14A, is referred to as the "device 12A"), to perform a process. Under this condition, when the automatic switching function is set to ON, and when the access point, to be connected to the terminal apparatus 10, may be switched (for example, when the reception strength of radio waves from the access point 14B at the terminal apparatus 10 is higher than that from the access point 14A), the processor 22 of the terminal apparatus 10 automatically switches the access point, to be connected to the terminal apparatus 10, from the access point 14A to the access point 14B. When the device 12A is not connected to the access point 14B, if the access point, to be connected to the terminal apparatus 10, is switched to the access point 14B, the terminal apparatus 10 fails to connect to the device 12A via the access point 14A and fails to request the device 12A to perform a process. For example, while a user, who has requested the device 12A to perform a process, does not recognize that the access point, to be connected, is automatically switched from the access point 14A to the access point 14B, the access point, to be connected, may be automatically switched from the access point 14A to the access point 14B.

According to the exemplary embodiment, in the case where the automatic switching function is set to ON, when the access point, to be connected to the terminal apparatus 10, may be switched automatically, alert information is output. Thus, a user is given an opportunity in which the user recognizes that the connecting access point, to be connected, is switched automatically. For example, in response to the alert information, the user may change the setting of the automatic switching function from ON to OFF.

Figure 3:
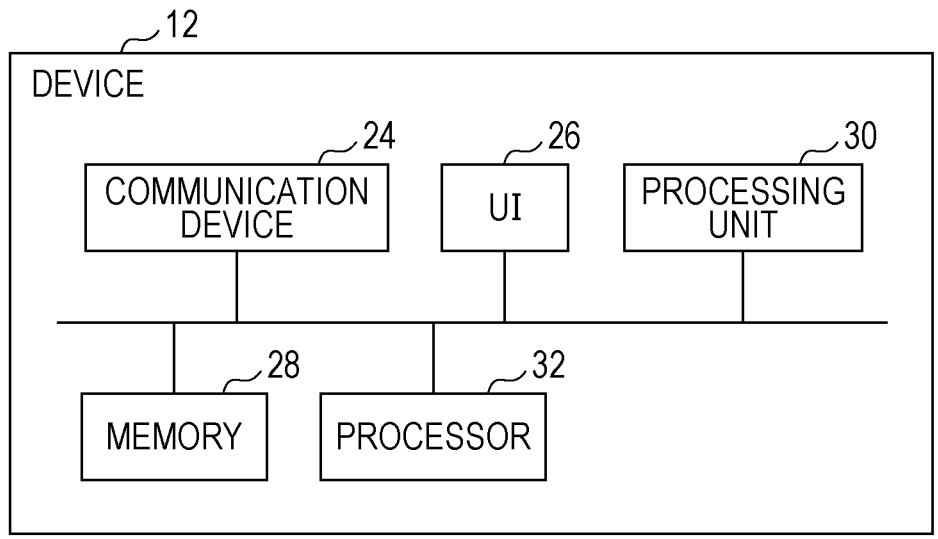
FIG. 3 is a block diagram illustrating the hardware configuration of a device.

Referring to FIG. 3, the hardware configuration of a device 12 will be described below. FIG. 3 illustrates an exemplary hardware configuration of a device 12.

The device 12 includes, for example, a communication device 24, a UI 26, a memory 28, a processing unit 30, and a processor 32.

The communication device 24 is a communication interface having a communication chip, a communication circuit, or the like, and has a function of transmitting information to other apparatuses and a function of receiving information transmitted from other apparatuses. The communication device 24, which has a wireless communication function, connects to an access point through wireless communication, and communicates with other apparatuses via the access point. The communication device 24 may have a wired communication function.

The UI 26, which is a user interface, includes a display and operation devices. The display is, for example, a liquid-crystal display or an EL display. Examples of the operation devices include a keyboard, a mouse, an input key, and an operation panel. The UI 26 may be a UI such as a touch panel which serves as a display and an operation device. The UI 26 may include a microphone and a speaker.

The memory 28 is a device constituting one or more storage areas for storing data. The memory 28 is, for example, an HDD, an SSD, various memories (for example, a RAM, a DRAM, and a ROM), another storage device (for example, an optical disk), or a combination of these. The device 12 includes one or more memories 28.

The memory 28 is used to store, in advance, device identification information for identifying the device 12 (for example, information indicating the name of the device 12 or the MAC address), and connection information for connection to the device 12 (for example, the IP address of the device 12).

The processing unit 30 performs a process implemented by using functions of the device 12.

For example, when the device 12 is a printer, the processing unit 30 forms an image or a document, which is to be printed, on a recording medium such as a sheet. Thus, an image or a document, which is to be printed, is printed on a recording medium. The print method may be any method. For example, a method, such as the inkjet system, the electrophotographic system, the thermal printing system, or the thermal transfer printing system, may be used. For example, print data, which includes an image or a document to be printed and which also includes a print condition, is transmitted from the terminal apparatus 10 via an access point to the device 12. The processing unit 30 receives the print data, and prints the image or the document on a recording medium.

The device 12 may include a scanner. In this case, the processing unit 30 may perform scanning to generate an image or make a copy. An image generated through scanning may be transmitted from the device 12 via the access point to the terminal apparatus 10. The device 12 may include a facsimile.

In this example, the case in which the device 12 is a printer or a multifunction device is described. Alternatively, the device 12 may be a device other than a printer or a multifunction device. For example, when the device 12 is an air conditioner, the processing unit 30 controls air conditioning, such as cooling and warming, according to a request transmitted from the terminal apparatus 10 via an access point. For example, turning on/off the power supply, the temperature, and the wind direction are controlled. For example, other electric household appliances are controlled similarly.

The processor 32 controls operations of the units of the device 12. The processor 32 may include a memory.

The exemplary embodiment will be described in detail below by taking concrete examples.

In an example described below, the device 12 is a printer, and is connected to the access point 14A. As described above, the device 12, which connects to the access point 14A, is referred to as the "device 12A". For example, the device 12A is connected to the same LAN as that of the access point 14A. The terminal apparatus 10, which establishes a connection to the access point 14A, connects to the device 12A via the access point 14A, and is capable of requesting the device 12A, which is a printer, to perform printing.

The device 12A is not connected to the access point 14B. Therefore, even if the terminal apparatus 10 establishes a connection to the access point 14B, the terminal apparatus 10 fails to connect to the device 12A via the access point 14B.

The access point 14A may be included in the device 12A. That is, the device 12A may be a device in which the access point 14A is embedded.

The access point 14A corresponds to an exemplary first access point, and the access point 14B corresponds to an exemplary second access point.

Figure 4:
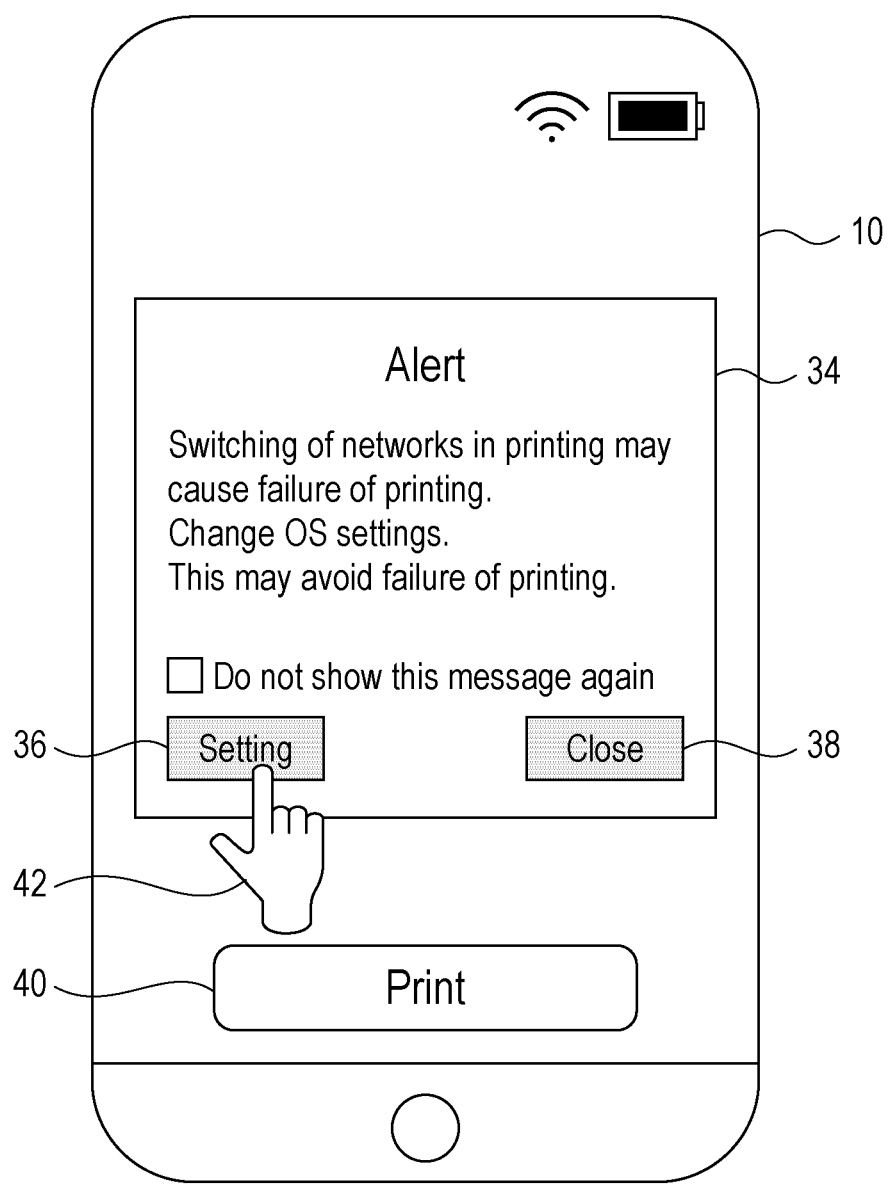
FIG. 4 is a diagram illustrating a screen.

Referring to FIG. 4, the alert information will be described below. FIG. 4 illustrates a screen, for description, which is displayed on the terminal apparatus 10. A screen 34 is an alert screen on which the alert information is displayed and which is displayed as output of the alert information on the display of the terminal apparatus 10.

For example, the automatic switching function is set to ON in the terminal apparatus 10. In this case, when the terminal apparatus 10 connects to the access point 14A which is capable of connecting to the device 12A, if the terminal apparatus 10 may establish a connection to the access point 14B which is not capable of connecting to the device 12A and whose reception strength of radio waves is higher than that from the access point 14A at the terminal apparatus 10, the processor 22 of the terminal apparatus 10 displays the screen 34 on the display of the terminal apparatus 10. The processor 22 of the terminal apparatus 10 displays, on the screen 34, alert information indicating that the access point, to be connected to the terminal apparatus 10, may be switched from the access point 14A to the access point 14B.

For example, when the access point is switched in execution of printing, a message that the printing may fail is displayed on the screen 34.

The processor 22 of the terminal apparatus 10 may prompt a user to change the setting in which the access point, to be connected to the terminal apparatus 10, is switched automatically. That is, the processor 22 of the terminal apparatus 10 may prompt the user to change the setting of the automatic switching function. For example, the processor 22 of the terminal apparatus 10 displays, on the screen 34, a message for prompting the user to change the setting of the automatic switching function from ON to OFF. In the example in FIG. 4, a message indicating that, by changing a setting of the operating system (OS) (specifically, the setting of the automatic switching function), failure of the printing may be avoided is displayed on the screen 34. The message corresponds to an exemplary message for prompting a user to change the setting of the automatic switching function.

On the screen 34, a "setting" button 36 and a "close" button 38 are displayed. The "setting" button 36 is a button for giving an instruction to display a setting screen. The setting screen is a screen for setting the automatic switching function. The "close" button 38 is a button for giving an instruction to close the screen 34. When a user presses the "setting" button 36 (for example, when touching, clicking, or tapping is performed), the processor 22 of the terminal apparatus 10 displays the setting screen on the display of the terminal apparatus 10. In the example in FIG. 4, when the "setting" button 36 is pressed by using the user's finger 42, the setting screen is displayed. When the user presses the "close" button 38, the screen 34 is not displayed.

A "print" button 40 is displayed on the display of the terminal apparatus 10. When the user presses the "print" button 40, the processor 22 of the terminal apparatus 10 transmits print data to the device 12A via the access point 14A, and requests the device 12A to perform printing.

Figure 5:
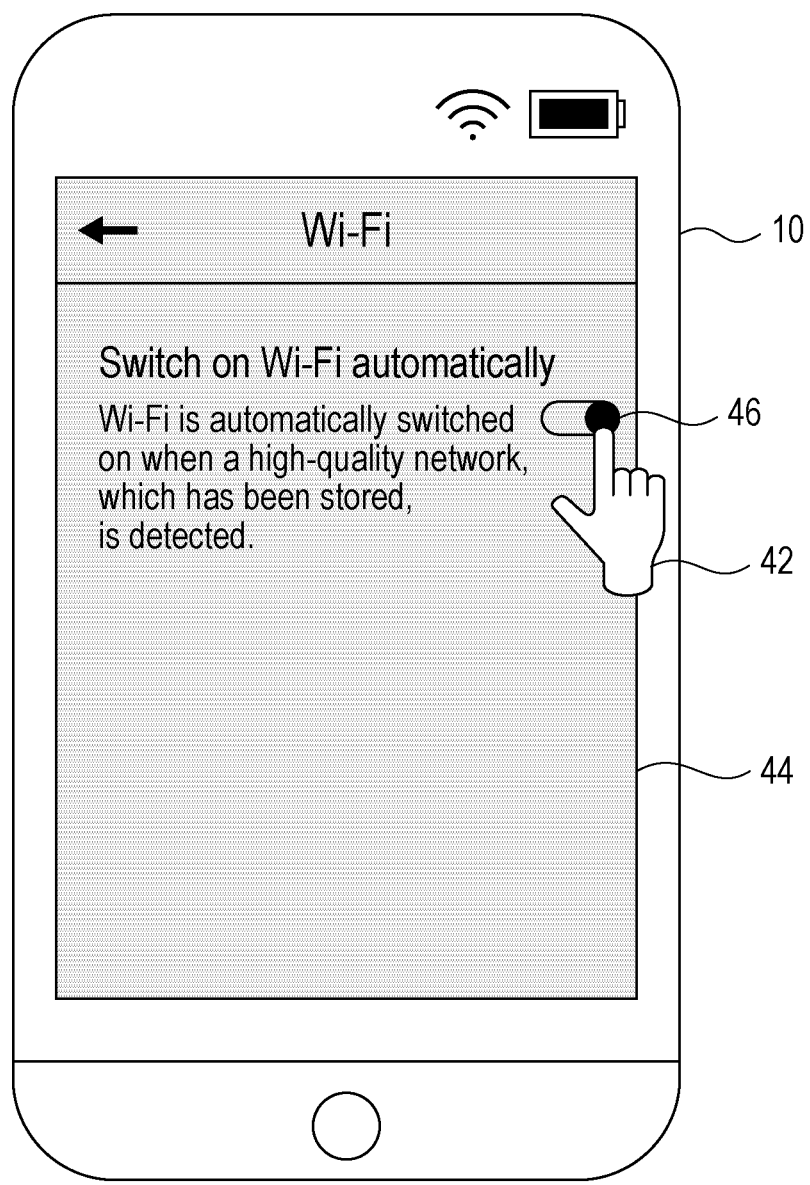
FIG. 5 is a diagram illustrating a screen.

FIG. 5 illustrates a setting screen 44 for setting the automatic switching function. For example, the setting screen 44 is a screen for setting the automatic switching function for Wi-Fi to ON or OFF. On the setting screen 44, a "setting" button 46 is displayed. Through operation on the "setting" button 46, the automatic switching function may be switched between ON and OFF.

When a user, who operates the "setting" button 46, sets the automatic switching function to ON, the processor 22 of the terminal apparatus 10 performs the automatic switching function, and switches the access point, to be connected, automatically.

When the user, who operates the "setting" button 46, sets the automatic switching function to OFF, the processor 22 of the terminal apparatus 10 does not perform the automatic switching function.

Embodiment examples of the exemplary embodiment will be described below.

FIRST EMBODIMENT EXAMPLE

Figure 6:
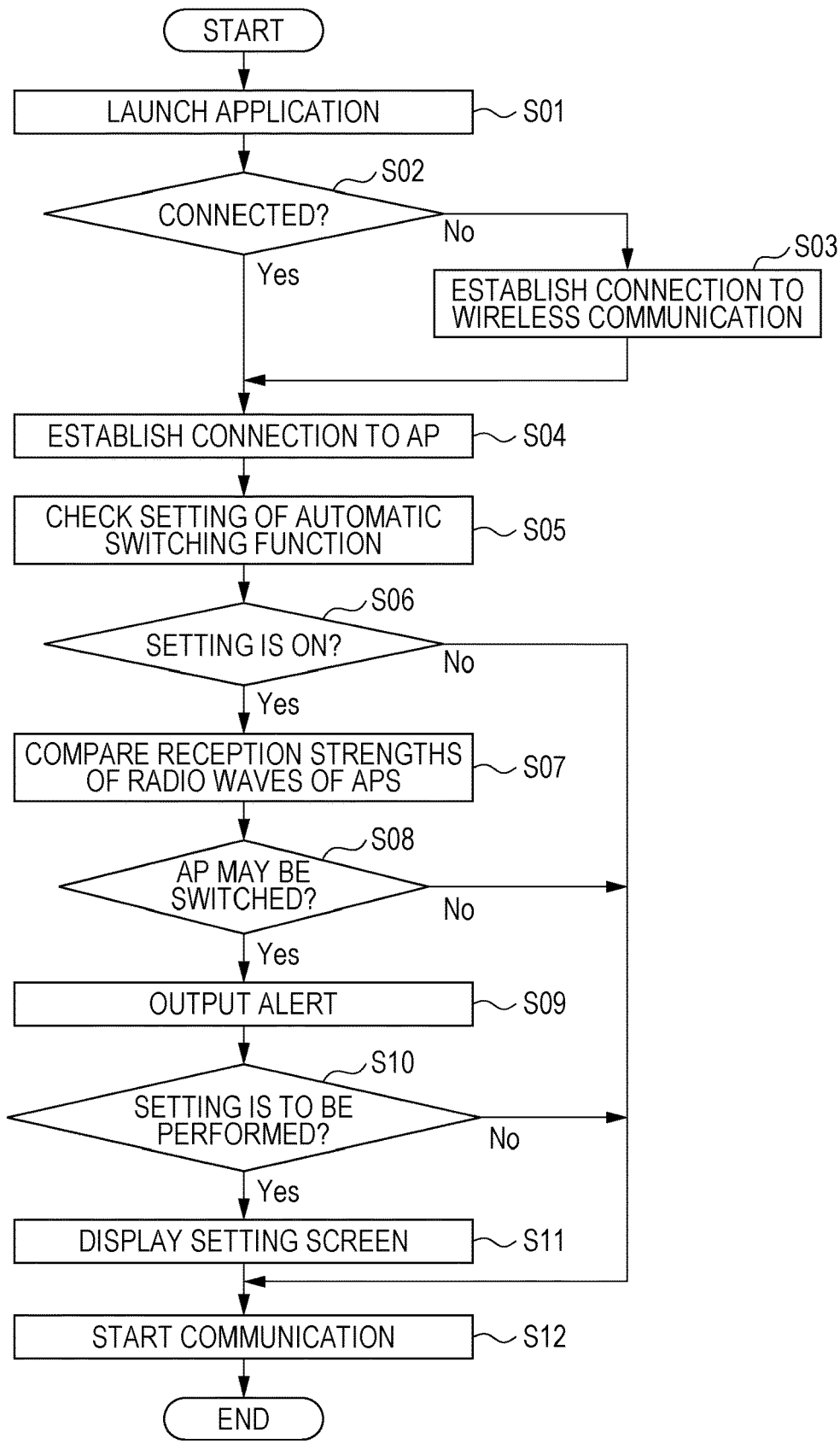
FIG. 6 is a flowchart of a process according to a first embodiment example.

Referring to FIG. 6, a process according to a first embodiment example will be described. FIG. 6 illustrates a flowchart of a process according to the first embodiment example.

A user launches print application software installed in the terminal apparatus 10 (S01). For example, in the terminal apparatus 10, the print application software for giving the device 12 an instruction to perform printing or for controlling printing is installed in advance. When printing is to be performed by using the device 12, the user launches the print application software on the terminal apparatus 10.

For example, when the user uses the terminal apparatus 10 to give, on the print application software, an instruction to display a list of devices 12 registered in the terminal apparatus 10, the processor 22 of the terminal apparatus 10 displays, on the display of the terminal apparatus 10, a list of devices 12 registered in the terminal apparatus 10. The user selects, from the list, a device 12 that is to perform printing. For example, the user selects the device 12A as a device that is to perform printing.

For example, the device identification information (for example, information indicating the name of the device 12) for identifying the device 12, connection information (for example, the IP address of the device 12) for establishing a connection to the device 12, and AP identification information for identifying an access point 14 which is capable of connecting to the device 12 are associated with each other, and are managed as registration information of the device 12 by the print application software. For each device 12, registration information is generated and managed. The registration information of each device 12 may be stored in the memory 20 of the terminal apparatus 10, or may be stored in a different apparatus such as a server.

Each access point (AP) has assigned AP identification information for identifying the access point. For example, AP identification information is stored in each access point. AP identification information is, for example, a service set identifier (SSID), a basic service set identifier (BSSID), or an extended service set identifier (ESSID) in wireless Wi-Fi. When a password for use of an access point is set to the access point, the AP identification information may include the password.

For example, one or more devices 12 are registered in advance in the print application software. A list of registration information of the one or more devices 12 is displayed as a list of the devices 12 on the display of the terminal apparatus 10. A list of device identification information included in registration information may be displayed.

When the terminal apparatus 10 was connected to an access point 14, the processor 22 of the terminal apparatus 10 may have obtained registration information of the devices 12, which were connected to the access point 14, from the devices 12 or the access point 14, and may have registered the obtained information in the print application software or may have stored the obtained information in the memory 20 of the terminal apparatus 10.

A user may manually input registration information of each device 12 by using the terminal apparatus 10. The processor 22 of the terminal apparatus 10 may register, in the print application software, the registration information of each device 12 which is input by the user, or may store the registration information of each device 12 in the memory 20 of the terminal apparatus 10.

The processor 22 of the terminal apparatus 10 checks if the terminal apparatus 10 connects to wireless communication (for example, Wi-Fi) (S02).

If the terminal apparatus 10 does not connect to Wi-Fi (No in S02), the processor 22 of the terminal apparatus 10 establishes a connection to Wi-Fi (S03). The processor 22 of the terminal apparatus 10 may display, on the display of the terminal apparatus 10, a message for prompting the user to establish a connection to Wi-Fi. When the user switches on the connection manually, the processor 22 of the terminal apparatus 10 establishes a connection to Wi-Fi.

If the terminal apparatus 10 connects to Wi-Fi (Yes in S02), or if the terminal apparatus 10 establishes a connection to Wi-Fi in step S03, the processor 22 of the terminal apparatus 10 establishes a connection to the access point 14A which is capable of connecting to the device 12A selected by the user in step S01 (S04). The registration information of the device 12A includes the AP identification information of the access point 14A which is capable of connecting to the device 12A. The processor 22 of the terminal apparatus 10 establishes a connection to the access point 14A by using the AP identification information.

The processor 22 of the terminal apparatus 10 checks the setting of the automatic switching function for Wi-Fi (S05). Specifically, the processor 22 of the terminal apparatus 10 checks whether the automatic switching function is set to ON or OFF, If the automatic switching function is set to OFF (No in S06), the process proceeds to step S12. The processor 22 of the terminal apparatus 10 communicates with the device 12A via the access point 14A (S12). When the user uses the terminal apparatus 10 to give the device 12A an instruction to perform printing, the processor 22 of the terminal apparatus 10 transmits, to the device 12A via the access point 14A, print data including an image or a document that is to be printed. The device 12A performs printing according to the print data. Thus, the print target is printed on a recording medium such as a sheet. Since the automatic switching function is set to OFF, the access point, to which the terminal apparatus 10 connects, is not automatically switched from the access point 14A to a second access point 14.

If the automatic switching function is set to ON (Yes in S06), the processor 22 of the terminal apparatus 10 compares reception strengths of radio waves of multiple access points 14 with each other (S07). For example, assume that the processor 22 of the terminal apparatus 10 receives radio waves from the access points 14A and 14B. In this case, the processor 22 of the terminal apparatus 10 compares the reception strength of radio waves from the access point 14A at the terminal apparatus 10 with that from the access point 14B at the terminal apparatus 10.

If the result of the comparison of received radio waves indicates that the access point, to which the terminal apparatus 10 connects, is not allowed to be switched from the access point 14A to a second access point 14 (for example, the access point 14B) (No in S08), the process proceeds to step S12. As described above, in step S12, the processor 22 of the terminal apparatus 10 communicates with the device 12A via the access point 14A, and transmits, to the device 12A, print data to make the device 12A perform printing.

If the access point, to which the terminal apparatus 10 connects, may be switched from the access point 14A to a second access point 14 (for example, the access point 14B) (Yes in S08), the processor 22 of the terminal apparatus 10 outputs alert information (S09). For example, the processor 22 of the terminal apparatus 10 displays, on the display of the terminal apparatus 10, the screen 34 illustrated in FIG. 4.

For example, when the reception strength of radio waves from the access point 14B at the terminal apparatus 10 is higher than that from the access point 14A, the processor 22 of the terminal apparatus 10 outputs the alert information. As another example, when the reception strength of radio waves from the access point 14B at the terminal apparatus 10 is higher than that from the access point 14A, if the difference between the reception strength of radio waves from the access point 14A and that from the access point 14B, which is higher than that from the access point 14A, is equal to or greater than the threshold, the processor 22 of the terminal apparatus 10 may output the alert information. As another example, when the reception strength of radio waves from the access point 14A is equal to or lower than the lower-limit threshold, the processor 22 of the terminal apparatus 10 may output the alert information.

If the user does not set the automatic switching function (No in S10), the process proceeds to step S12. For example, if the user presses the "close" button 38 on the screen 34, the processor 22 of the terminal apparatus 10 erases the screen 34, and performs the process in step S12. As described above, in step S12, the processor 22 of the terminal apparatus 10 communicates with the device 12A via the access point 14A, and transmits print data to the device 12A. Since the automatic switching function is set to ON, the access point, to which the terminal apparatus 10 connects, may be automatically switched from the access point 14A to a second access point 14 (for example, the access point 14B).

If the user sets the automatic switching function (Yes in S10), the processor 22 of the terminal apparatus 10 displays, on the display of the terminal apparatus 10, a setting screen for setting the automatic switching function (S11). For example, the processor 22 of the terminal apparatus 10 displays, on the display of the terminal apparatus 10, the setting screen 44 illustrated in FIG. 5. The user sets the automatic switching function on the setting screen 44. For example, the user switches the automatic switching function from ON to OFF. As a matter of course, the user may keep the automatic switching function ON. After step S11, the process proceeds to step S12.

As described above, in step S12, the processor 22 of the terminal apparatus 10 communicates with the device 12A via the access point 14A, and transmits print data to the device 12A. When the automatic switching function is switched from ON to OFF on the setting screen 44, the possibility that the access point, to which the terminal apparatus 10 connects, is automatically switched from the access point 14A to a second access point 14 (for example, the access point 14B) decreases compared with the case in which the automatic switching function remains ON.

SECOND EMBODIMENT EXAMPLE

A second embodiment example will be described below. In the second embodiment example, a success probability of execution of a process performed by the device 12 is presented to a user.

For example, assume that the terminal apparatus 10 connects to the access point 14A which is a first access point, and that the terminal apparatus 10 receives radio waves from the access point 14B, which is a second access point, as well as radio waves from the access point 14A. In this case, the processor 22 of the terminal apparatus 10 outputs a success probability of execution of a process on the basis of the relationship between the volume of data transmitted to the device 12 which performs the process, the reception strength of radio waves from the access point 14A at the terminal apparatus 10, and that from the access point 14B. For example, information indicating the success probability is displayed on the display of the terminal apparatus 10.

As the reception strength of radio waves from a first access point (for example, the access point 14A) at the terminal apparatus 10 is higher, the success probability increases. As the reception strength of radio waves from a second access point (for example, the access point 14B) at the terminal apparatus 10 is higher, the success probability decreases. As the volume of data is larger, the success probability decreases.

That is, as the reception strength of radio waves from a first access point at the terminal apparatus 10 is higher, the probability of completion of transmission of data to the device 12, which is the transmission destination, from the terminal apparatus 10 is higher, resulting in a higher success probability. As the reception strength of radio waves from a second access point at the terminal apparatus 10 is higher, the possibility that the access point, to be connected to the terminal apparatus 10, is switched to the second access point is higher, resulting in a low success probability. As the volume of data transmitted to the device 12, which performs processes, is larger, the possibility of failure of data transmission, for example, due to abort of data transmission is higher, resulting in a low success probability. On the basis of these reasons, a success probability is calculated.

For example, a success probability is calculated by using Expression (1).

$$\text{success probability [\%]} 50 + a \times (\text{AP strength in connection} - \text{second-AP strength}) - b \times (\text{data volume}) \quad (1)$$

The value "50" is a predetermined value, and may be changed, for example, in accordance with the history of the actual success probabilities, measured values, or empirical values.

The "AP strength in connection" indicates the reception strength of radio waves from a first access point, to which the terminal apparatus 10 connects.

The "second-AP strength" indicates the reception strength of radio waves from a second access point.

The "data volume" is the volume of data transmitted to the device 12 which performs processes.

The symbols, a and b, indicate constant values, and, for example, are determined by using the history of the actual success probabilities, measured values, or empirical values.

A success probability may be calculated by the processor 22 of the terminal apparatus 10, may be calculated by the device 12, or may be calculated by an apparatus such as a server.

When multiple second access points are present, that is, when the terminal apparatus 10 receives radio waves from multiple second access points, the "second-AP strength" may be the average of the reception strengths of radio waves from the multiple second access points, or may be the reception strength of radio waves from the access point having the highest reception strength among the multiple second access points.

For example, when print data is transmitted to the device 12A, which is a printer, and the device 12A is made to print the print data, the processor 22 of the terminal apparatus 10 calculates the success probability according to Expression (1) described above, and displays, on the display of the terminal apparatus 10, information indicating the success probability. The "data volume" in Expression (1) may be the volume of data of an image, a document, or the like that is to be printed, or may be the volume of print data including data of an image, a document, or the like that is to be printed, and its print condition.

Figure 7:
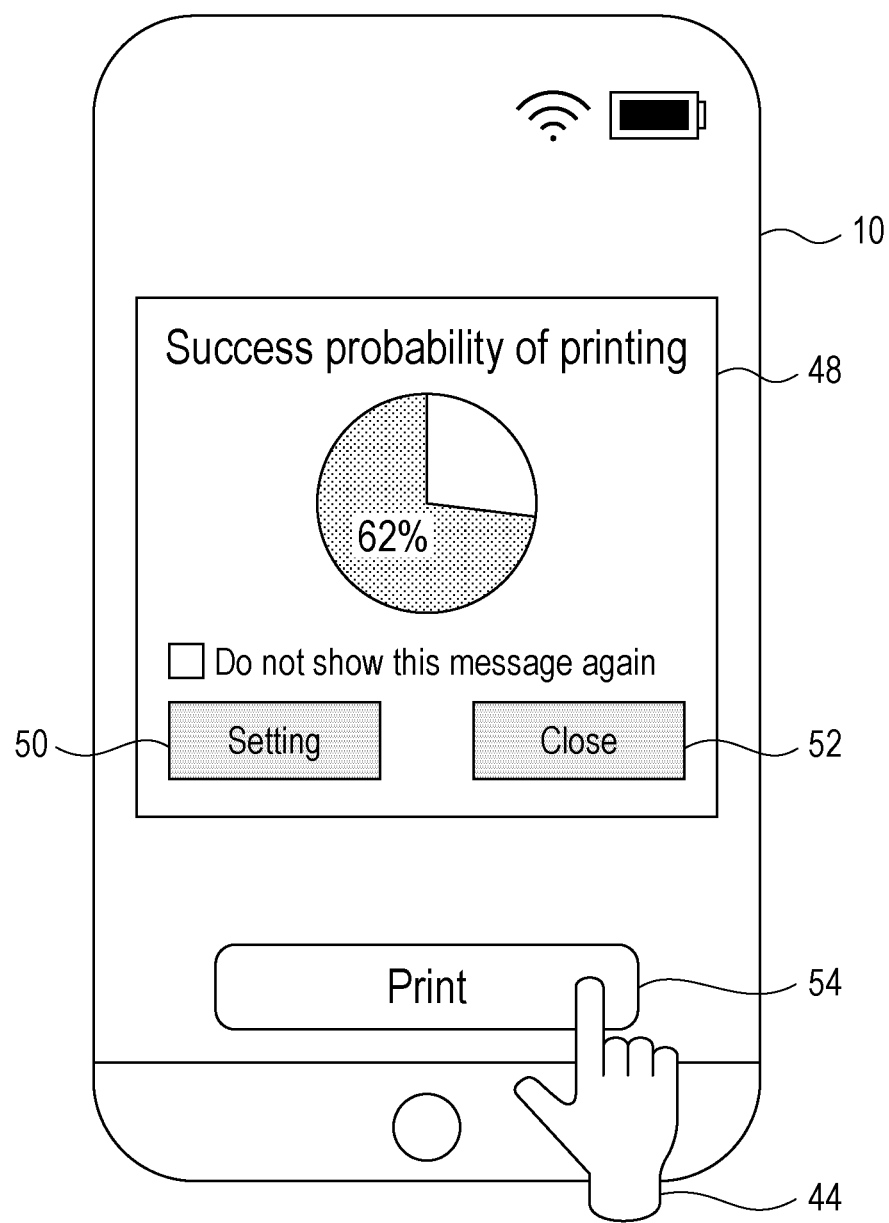
FIG. 7 is a diagram illustrating a screen.

FIG. 7 illustrates an exemplary display of a success probability. For example, a user uses the terminal apparatus 10 to select the device 12A, which is to perform printing, and an image or a document that is to be printed, the processor 22 of the terminal apparatus 10 calculates a success probability according to Expression (1) described above. That is, the processor 22 of the terminal apparatus 10 calculates a success probability according to Expression (1), described above, on the basis of the following data: the reception strength of radio waves from the access point 14A, to which the terminal apparatus 10 connects and which is capable of connecting to the device 12A; the reception strength of radio waves of a second access point (for example, the access point 14B); and the volume of print data including an image or a document that is to be printed.

The processor 22 of the terminal apparatus 10 displays a screen 48 on the display of the terminal apparatus 10, and displays, on the screen 48, information indicating the calculated success probability. In the example in FIG. 7, the success probability of certain printing which is an exemplary process is displayed on the screen 48. In this example, the success probability is 62%. A graph indicating the success probability may be displayed.

On the screen 48, a "setting" button 50 and a "close" button 52 are displayed. The "setting" button 50 is a button for giving an instruction to display the setting screen 44 illustrated in FIG. 5. The "close" button 52 is a button for giving an instruction to close the screen 48. When a user presses the "setting" button 50, the processor 22 of the terminal apparatus 10 displays the setting screen 44 on the display of the terminal apparatus 10.

A "print" button 54 is displayed on the display of the terminal apparatus 10. When a user presses the "print" button 54, the processor 22 of the terminal apparatus 10 transmits print data to the device 12A via the access point 14A, and requests the device 12A to perform printing. The user may refer to the success probability to determine whether printing is to be performed.

Figure 8:
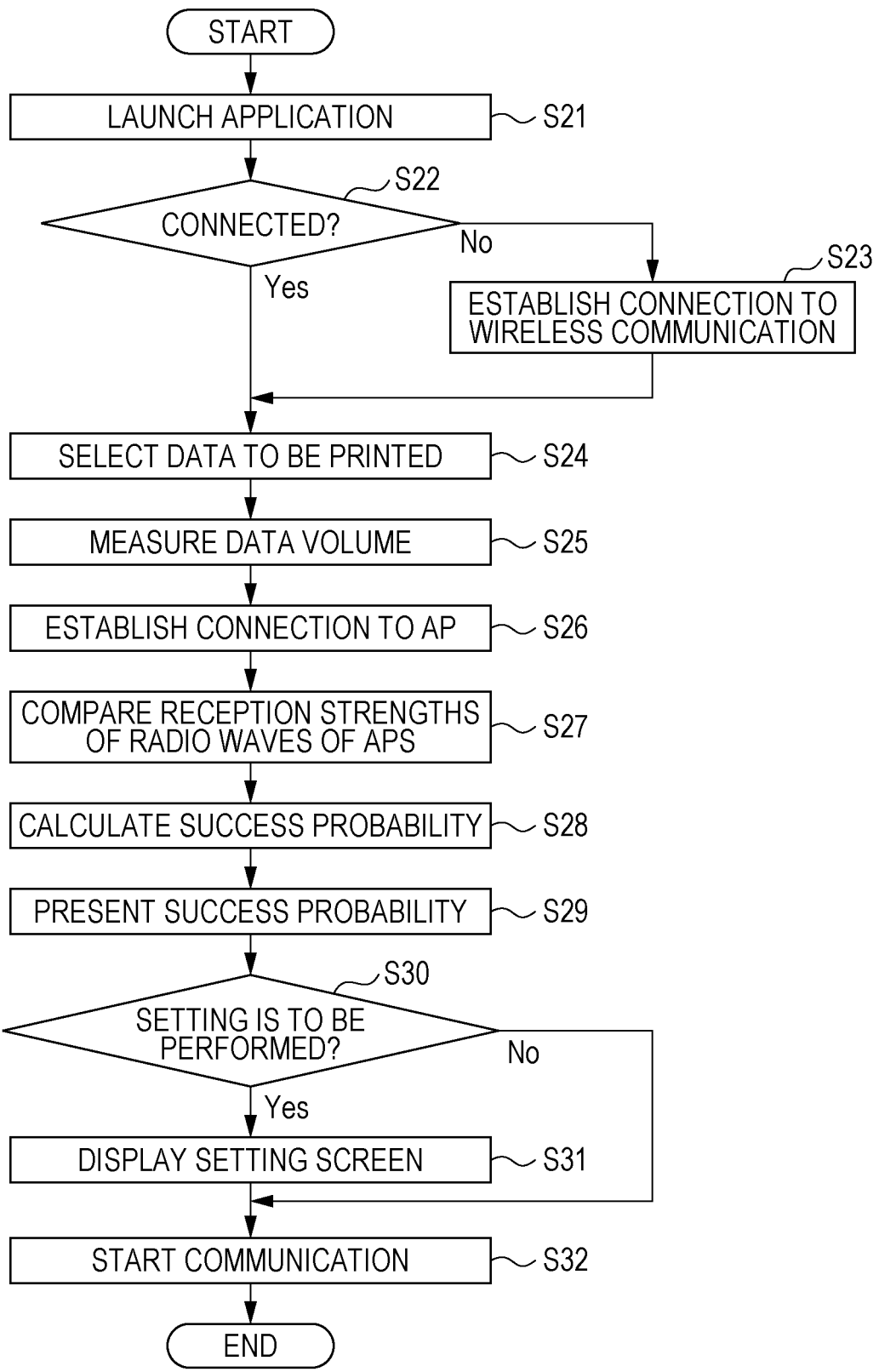
FIG. 8 is a flowchart of a process according to a second embodiment example.

Referring to FIG. 8, a process according to the second embodiment example will be described below. FIG. 8 illustrates a flowchart of a process according to the second embodiment example. In the terminal apparatus 10, the automatic switching function is set to ON.

A user launches the print application software installed in the terminal apparatus 10 (S21). The process in step S21 is the same as the process in step S01 described above, and will not described in detail. For example, the user selects the device 12A as a device that is to perform printing.

The processor 22 of the terminal apparatus 10 checks whether the terminal apparatus 10 connects to wireless communication (for example, Wi-Fi) (S22).

If the terminal apparatus 10 does not connect to Wi-Fi (No in S22), the processor 22 of the terminal apparatus 10 establishes a connection to Wi-Fi (S23). The processor 22 of the terminal apparatus 10 may display, on the display of the terminal apparatus 10, a message for prompting a user to establish a connection to Wi-Fi. When the user switches on the connection manually, the processor 22 of the terminal apparatus 10 establishes a connection to Wi-Fi.

If the terminal apparatus 10 connects to Wi-Fi (Yes in S22), or if the terminal apparatus 10 establishes a connection to Wi-Fi in step 23, the process proceeds to step S24.

The user uses the terminal apparatus 10 to select data (for example, an image or a document) that is to be printed (S24). For example, a list of images and documents is displayed on the display of the terminal apparatus 10, and the user selects, from the list, an image or a document that is to be printed.

When the user selects data that is to be printed, the processor 22 of the terminal apparatus 10 measures the volume of the data (for example, an image or a document) which is to be printed (S25). The processor 22 of the terminal apparatus 10 may measure the volume of the entire print data including data, which is to be printed, and its print condition.

The processor 22 of the terminal apparatus 10 establishes a connection to the access point 14A which is capable of connecting to the device 12A selected by the user in step S21 (S26). The process in step S26 is the same as that in step S04 described above, and will not be described.

The processor 22 of the terminal apparatus 10 compares the reception strengths of radio waves of multiple access points 14 with each other (S27). For example, assume that the processor 22 of the terminal apparatus 10 receives radio waves from the access points 14A and 14B. In this case, the processor 22 of the terminal apparatus 10 compares the reception strength of radio waves from the access point 14A at the terminal apparatus 10 with that from the access point 14B at the terminal apparatus 10.

The processor 22 of the terminal apparatus 10 calculates a success probability of printing according to Expression (1) described above (S28). Specifically, the processor 22 of the terminal apparatus 10 substitutes, into Expression (1), the reception strength of radio waves from the access point 14A, to which the terminal apparatus 10 connects, the reception strength of radio waves from the access point 14B, which is a second access point, and the volume of the print data, and calculates the success probability. Instead of the volume of the print data, the volume of data, not including the print condition, of the document, the image, or the like, which is to the printed, may be substituted into Expression (1).

The processor 22 of the terminal apparatus 10 displays, on the display of the terminal apparatus 10, information indicating the calculated success probability (S29). For example, the screen 48 illustrated in FIG. 7 is displayed on the display of the terminal apparatus 10. The user may refer to the success probability, which is displayed on the screen 48, to determine whether the printing is to be performed, or determine whether the automatic switching function is to be switched from ON to OFF.

If the user does not set the automatic switching function (No in S30), the process proceeds to step S32. For example, when the user presses the "close" button 52 on the screen 48, the processor 22 of the terminal apparatus 10 erases the screen 48, and performs the process in step S32.

In step S32, the processor 22 of the terminal apparatus 10 communicates with the device 12A via the access point 14A, and transmits print data to the device 12A to make the device 12A perform printing. For example, when the user uses the terminal apparatus 10 to instruct the device 12A to perform printing, the processor 22 of the terminal apparatus 10 transmits print data, including an image or a document which is to be printed, to the device 12A via the access point 14A. The device 12A performs printing according to the print data. Thus, the print target is printed on a recording medium such as a sheet.

If the user sets the automatic switching function (Yes in S30), the processor 22 of the terminal apparatus 10 displays, on the display of the terminal apparatus 10, the setting screen for setting the automatic switching function (S31). For example, the processor 22 of the terminal apparatus 10 displays, on the display of the terminal apparatus 10, the setting screen 44 illustrated in FIG. 5. The user sets the automatic switching function on the setting screen 44. For example, the user switches the automatic switching function from ON to OFF. As a matter of course, the user may keep the automatic switching function ON. After step S31, the process proceeds to step S32.

Modified examples will be described below.

FIRST MODIFIED EXAMPLE

In a first modified example, the processor 22 of the terminal apparatus 10 prompts a user to move to a place where the reception strength of radio waves from the access point to be connected (for example, the access point 14A) is higher.

For example, the reception strength of radio waves from each access point 14 is measured at positions in advance, and each access point 14 stores the values of the reception strength at the positions in advance. The values of reception strength of each access point 14 at the positions may be stored in an apparatus such as a server or the device 12, or may be stored in the memory 20 of the terminal apparatus 10.

The following pieces of data may be associated with each other, and may be stored in the memory 20 of the terminal apparatus 10: the reception strength of radio waves from an access point 14 which was connected to the terminal apparatus 10; position information indicating the position of the connection (for example, position information obtained from the Global Positioning System (GPS)); and AP identification information of the access point 14.

Position information indicating the position of the terminal apparatus 10, which is obtained when the terminal apparatus 10 succeeded in establishing a connection to the device 12 via an access point 14, may be stored in the memory 20 of the terminal apparatus 10.

The processor 22 of the terminal apparatus 10 may use application software, which measures the radio wave strengths of an access point 14 at positions, to measure the radio wave strengths of the access point 14 at positions.

The processor 22 of the terminal apparatus 10 compares the reception strengths of radio waves from the access point 14 at positions with that from the access point 14 at the current position, and prompts the user to move to a place where the reception strength of radio waves from the connected access point 14A is higher. For example, the processor 22 of the terminal apparatus 10 displays, on the display of the terminal apparatus 10, information indicating the direction and the distance in which the user is to move.

The processor 22 of the terminal apparatus 10 may display, on the display of the terminal apparatus 10, information indicating the direction and the distance in which the user is to be moved, until the user moves to a place where the reception strength of radio waves from the connected access point 14A is equal to or higher than a threshold. The processor 22 of the terminal apparatus 10 may display, on the display of the terminal apparatus 10, information indicating the direction and the distance in which the user is to move, until the user moves to a place where the reception strength of radio waves from the connected access point 14A is the highest. The processor 22 of the terminal apparatus 10 may generate, from the speaker, a voice announcing information indicating the direction and the distance in which the user is to move. The processor 22 of the terminal apparatus 10 may display, on the display of the terminal apparatus 10, a map indicating the direction and the distance in which the user is to move, or may display, on the display of the terminal apparatus 10, an image indicating the connected device 12A.

When the print application software is ended, or when a predetermined time has elapsed from a time point at which printing performed by the device 12A ends, the processor 22 of the terminal apparatus 10 may end prompting the user to move. For example, the processor 22 of the terminal apparatus 10 does not display, on the display of the terminal apparatus 10, information indicating the direction and the distance in which the user is to move.

The processor 22 of the terminal apparatus 10 may prompt or may not prompt the user to move in accordance with the reception strength of radio waves from the access point 14A at the terminal apparatus 10. For example, when the reception strength of radio waves from the access point 14A at the terminal apparatus 10 is lower than a threshold, the processor 22 of the terminal apparatus 10 prompts the user to move, and when the reception strength is equal to or higher than the threshold, the processor 22 of the terminal apparatus 10 does not prompt the user to move.

SECOND MODIFIED EXAMPLE

In a second modified example, the processor 22 of the terminal apparatus 10 prompts a user to limit the user's move, when the processor 22 of the terminal apparatus 10 establishes a connection to the access point, to be connected, (for example, the access point 14A) to request the device 12A to perform a process.

For example, when the processor 22 of the terminal apparatus 10 transmits print data to the device 12A (for example, a printer) via the access point 14A to request execution of printing, the processor 22 of the terminal apparatus 10 prompts the user, who has requested execution of printing, to limit the user's move. Specifically, the processor 22 of the terminal apparatus 10 displays, on the display of the terminal apparatus 10, a message, such as "Please do not move from your position." or "Please do not leave the device 12A." Since a request to perform printing is successfully transmitted to the device 12A via the access point 14A, it is presumed that the terminal apparatus 10 is connected to the access point 14A in a normal state at the current position of the user who carries the terminal apparatus 10. If the user moves while carrying the terminal apparatus 10, the reception strength of signals from the access point 14A at the terminal apparatus 10 may be decreased, or the terminal apparatus 10 may fail to receive signals from the access point 14A. To prevent this, the processor 22 of the terminal apparatus 10 prompts the user to limit the user's move.

The processor 22 of the terminal apparatus 10 may prompt the user to limit the user's move, until the process (for example, printing) completes.

When the reception strength of signals from the access point 14A at the terminal apparatus 10 is equal to or higher than a threshold at the current position of the user, the processor 22 of the terminal apparatus 10 may prompt the user to limit the user's move. When the reception strength is lower than the threshold, the processor 22 of the terminal apparatus 10 may prompt the user to move.

THIRD MODIFIED EXAMPLE

In a third modified example, in the case where the automatic switching function is set to ON, when the access point, to which the terminal apparatus 10 connects, may be switched to an access point having a slower transfer speed, the processor 22 of the terminal apparatus 10 outputs alert information. For example, when the standard of the access point, to which the terminal apparatus 10 connects, is IEEE802.11n (fast) and the standard of a second access point, having a higher reception strength, is IEEE802.11a (slow), if the access point, to be connected, is switched to the second access point automatically, execution of a process such as printing may take longer to complete. Output of alert information may cause a user to recognize that a process may take longer to complete.

The functions of the terminal apparatus 10, the device 12, and the access points 14, which are described above, are implemented, for example, through cooperation between hardware and software. For example, the processor of each apparatus reads programs, which are stored in a memory of the apparatus, for execution. Thus, the functions of each apparatus are implemented. The programs are stored in a memory through a recording medium, such as a compact disc (CD) or a digital versatile disc (DVD), or through a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
when first to third conditions are satisfied, output information indicating that there is possibility that an access point to be connected is switched, the first condition being that an automatic switching setting is ON, the automatic switching setting being a setting for automatically switching the access point, the automatic switching being made in accordance with a reception strength of a radio wave from the access point, the second condition being that the information processing apparatus connects to a first access point, the first access point being capable of connecting to a device, the device performing a process, the third condition being that the information processing apparatus is allowed to establish a connection to a second access point, the second access point being not capable of connecting to the device, the second access point having a higher reception strength of a radio wave than the first access point;
prompt a user to change the automatic switching setting in which the access point is switched automatically; and
receive the prompt of the user and subsequently change the setting in which the access point is switched automatically.

2. The information processing apparatus according to claim 1,
wherein the processor is configured to:
when a difference between the reception strength of the radio wave from the first access point and the reception strength of the radio wave from the second access point is equal to or higher than a threshold, output the information.

3. The information processing apparatus according to claim 2,
wherein the processor is further configured to:
when the information processing apparatus connects to the first access point to request execution of the process from the device, prompt a user to limit the user's move.

4. The information processing apparatus according to claim 3,
wherein the processer is further configured to:
prompt a user to move to a place where the reception strength of the radio wave from the first access point increases.

5. The information processing apparatus according to claim 2,
wherein the processer is further configured to:
prompt a user to move to a place where the reception strength of the radio wave from the first access point increases.

6. The information processing apparatus according to claim 1,
wherein the processor is further configured to:
when the information processing apparatus connects to the first access point to request execution of the process from the device, prompt a user to limit the user's move.

7. The information processing apparatus according to claim 6,
wherein the processer is further configured to:
prompt a user to move to a place where the reception strength of the radio wave from the first access point increases.

8. The information processing apparatus according to claim 1,
wherein the processer is further configured to:
prompt a user to move to a place where the reception strength of the radio wave from the first access point increases.

9. The information processing apparatus according to claim 1,
wherein the device is a printer,
wherein the process is printing of print data,
wherein the processor is further configured to:
when the printer is requested to perform printing, transmit the print data to the printer.

10. The information processing apparatus according to claim 9,
wherein the processer is further configured to:
output a success probability of printing on a basis of relationship between a volume of the print data, the reception strength of the radio wave from the first access point, and the reception strength of the radio wave from the second access point.

11. A non-transitory computer readable medium storing a program causing a computer to execute a process comprising:
when first to third conditions are satisfied, outputting information indicating that there is possibility that an access point to be connected is switched, the first condition being that an automatic switching setting is ON, the automatic switching setting being a setting for automatically switching the access point, the automatic switching being made in accordance with a reception strength of a radio wave from the access point, the second condition being that the information processing apparatus connects to a first access point, the first access point being capable of connecting to a device, the device performing a process, the third condition being that the information processing apparatus is allowed to establish a connection to a second access point, the second access point being not capable of connecting to the device, the second access point having a higher reception strength of a radio wave than the first access point;
prompting a user to change the automatic switching setting in which the access point is switched automatically; and
receiving the prompt of the user and subsequently changing the setting in which the access point is switched automatically.

12. An information processing method comprising:
checking whether first to third conditions are satisfied;
when the first to third conditions are satisfied, outputting information indicating that there is possibility that an access point to be connected is switched, the first condition being that an automatic switching setting is ON, the automatic switching setting being a setting for automatically switching the access point, the automatic switching being made in accordance with a reception strength of a radio wave from the access point, the second condition being that the information processing apparatus connects to a first access point, the first access point being capable of connecting to a device, the device performing a process, the third condition being that the information processing apparatus is allowed to establish a connection to a second access point, the second access point being not capable of connecting to the device, the second access point having a higher reception strength of a radio wave than the first access point;
prompting a user to change the automatic switching setting in which the access point is switched automatically; and
receiving the prompt of the user and subsequently changing the setting in which the access point is switched automatically.

* * * * *